United States Patent [19]
Persson

[11] 3,974,891
[45] Aug. 17, 1976

[54] CRAWLER VEHICLE
[75] Inventor: Jan Edvard Persson, Nacka, Sweden
[73] Assignee: Atlas Copco Aktiebolag, Nacka, Sweden
[22] Filed: Jan. 21, 1975
[21] Appl. No.: 542,807

[30] Foreign Application Priority Data
Jan. 25, 1974  Sweden.............................. 7400960

[52] U.S. Cl................................. 180/9.44; 180/9.5; 305/16
[51] Int. Cl.²........................................ B62D 11/00
[58] Field of Search................. 180/9.44, 9.46, 9.5, 180/6.54, 6.58; 305/16, 29, 30; 267/63 A

[56] References Cited
UNITED STATES PATENTS

| | | | |
|---|---|---|---|
| 2,830,826 | 4/1958 | Mantzel | 267/63 A |
| 2,978,050 | 4/1961 | Risk | 180/9.5 |
| 3,175,840 | 3/1965 | Webster | 280/104.5 A |

*Primary Examiner*—Philip Goodman
*Attorney, Agent, or Firm*—Flynn and Frishauf

[57] ABSTRACT

A crawler vehicle, e.g. a drill rig, has a main frame that is carried by two crawler assemblies having frames that are journal-mounted to the main frame. A transverse pivotable beam is coupled between the crawler frames by means of journal bearings that are obliquely inwardly directed so that the axes of the four bearings intersect each other at a single point. The transverse beam supports the main frame by means of a journal bearing, the axes of which lie in a vertical longitudinal plane through said point of intersection. All the journal bearings have an elastic bushing between the journal and the bearing box and relative movements in the bearings are taken up as shearing deformations in the elastic bushings.

62 Claims, 7 Drawing Figures

CRAWLER VEHICLE

BACKGROUND OF THE INVENTION AND BRIEF DESCRIPTION OF THE INVENTION

This invention relates to a crawler vehicle of the kind that comprises a main frame carried by two parallel crawler assemblies with frames that are mounted to the main frame to be pivotable relative to each other about axes transverse to the crawler frames.

In prior art vehicles of this kind, very high and troublesome dynamic stresses will appear both in the main frame and in the crawler frames when the vehicle moves in rough terrain due to the crawler frames being pivotably mounted to the main frame in conventional slide bearings that only permit movements in one plane. Particularly, very high bending loads will appear as a result of "toeing in" of the crawler frames. As a result of these high stresses, the main frame as well as the crawler frames must be overdimensioned and unnecessarily heavy.

Another problem associated with prior art vehicles of this kind is the demand for frequent maintenance in the form of lubrication of the bearings. In spite of a time consuming maintenance, the life of the conventional bearings is limited and the bearings cause considerable standstill and costs for renovation.

The present invention is intended to solve the problems and provided for a crawler vehicle in which the bending stresses in the main frame and the crawler frames and between the frames are considerably reduced. The invention also makes possible a lighter and cheaper construction of the frames of the vehicle.

According to the invention, elastic elements are utilized in the bearings between the crawler frames and the main frame.

In prior art vehicles of the kind referred to in which a transverse beam is connected between the crawler frames to support the main frame and balance the pivotal movement of the crawler frames, a cheaper and more robust construction can be provided by the present invention at the same time as the dynamic loads on the construction and the demands for maintenance are considerably reduced. In order to make possible any pivoting of the crawler frames, prior art vehicles of this kind have connections between the transverse beam and the crawler frames that permit free movement transverse to the crawler frames. Alternatively, the transverse beam has been constructed to permit free variation of its length during the pivoting of the crawler frames. Such arrangements mean that the transverse beam cannot transmit laterally directed forces from the crawler frames to the main frame and, as a result, all lateral forces and bending forces must be taken up in the bearings that directly connect the crawler frames to the main frame. In turn, this fact results in that very high bending forces will be imposed on the bearings, and the bearings and the crawler frames must be dimensioned to withstand these forces.

SUMMARY OF THE INVENTION

In an embodiment according to the invention and including a transverse beam as described above, the transverse beam is connected to the crawler frames by means of elastic material, e.g., rubber. Preferably, the transverse beam should be connected to the crawler frames by journal bearings that are directed obliquely inwardly so that there will be a minimum of bending in these bearings when the crawler frames pivot but the movements in the bearings will merely be a combination of turning and axial movement which are taken up in the bearings as shearing deformation in elastic bushings in the bearings. A transverse beam connected between the frames in this new way will be able to transmit lateral forces between the crawler frames and between the crawler frames and the main frame. Further, all the elastic elements will impose return forces on the crawler frames when the crawler frames are pivoted relative to each other and these return forces will make the vehicle move smoother over uneven terrain.

The invention is generally appliable to crawler vehicles that comprise a main frame and two pivotable crawler assemblies. As examples of such vehicles can be mentioned tractors, bull-dozers, digging machines, loading machines, and drill rigs for blast hole drilling, exploration hole drilling, well drilling and the like. The invention as applied to a drill rig will be described in detail with reference to the accompanying drawings.

DETAILED DESCRIPTION OF ILLUSTRATED EMBODIMENTS

Figure 1:
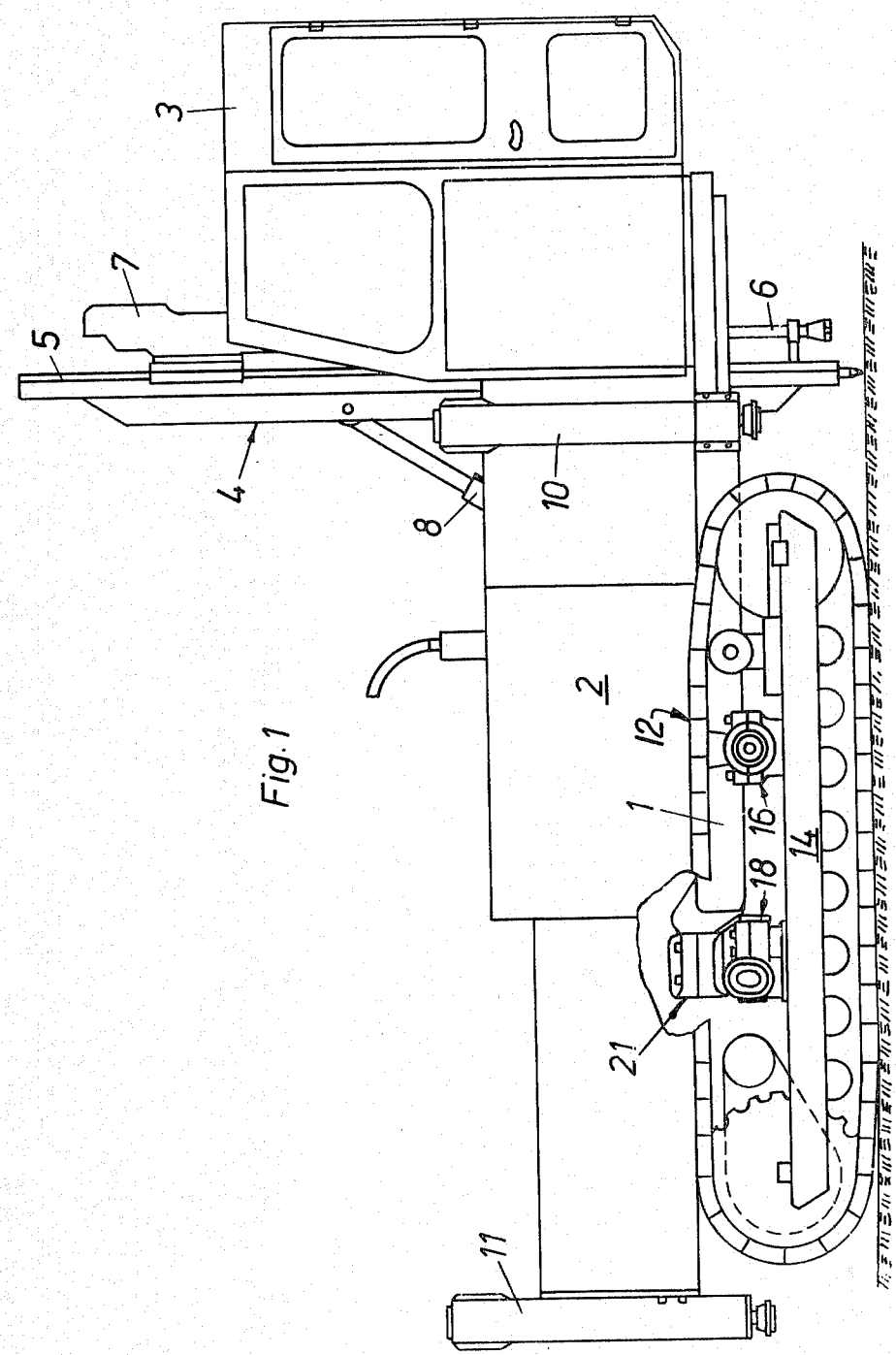
FIG. 1 is a side view of a crawler track carried drill rig in accordance with the invention.

The drill rig shown in FIG. 1 comprises a main frame which carries a motor unit 2, an operator's cabin 3, and a drilling apparatus 4. The drilling apparatus comprises a feed bar 5 and a drill 7 that is coupled to a drill rod 6. The feed bar 5 is extendable and adjustable to various inclined positions relative to the main frame 1 by means of two hydraulic cylinders 8. Further, the drill rig is provided with two jacks 10 and 11 which together with the feed bar 5 are adapted to support the drill rig during drilling.

In its position for transport the drill rig is carried by two crawler assemblies 12, 13 (FIG. 2) movably connected to the main frame. Each crawler assembly comprises a crawler frame 14 on which support wheels and drive wheels for the endless track are mounted. The tracks and their support wheels and drive wheels are conventional and will not be illustrated or described in detail. As can be seen from the figures, particularly FIG. 2, the crawler frames 14 are connected to the main frame on the one hand directly by a pair of first bearings 16 and 17 respectively and on the other hand by bearings 18 and 19 via a transverse beam 20 that is pivotably mounted to the main frame 1 by means of a bearing 21.

The drill rig carries the drilling apparatus 4 at one side and the bearing 21 between the main frame and the transverse beam is not in the middle but is displaced towards the same side. See FIG. 2. By this arrangement, the main frame 1 and thereby the drilling apparatus 4 will follow the ground at the side at which the drilling apparatus is mounted more than the other side (although the main frame will not follow the crawler assembly 13 as if it were rigidly mounted thereto). This construction will reduce the range of adjustment needed to level the drill rig into drilling position by means of the jacks 10, 11 and the feed bar 5.

Figure 5:
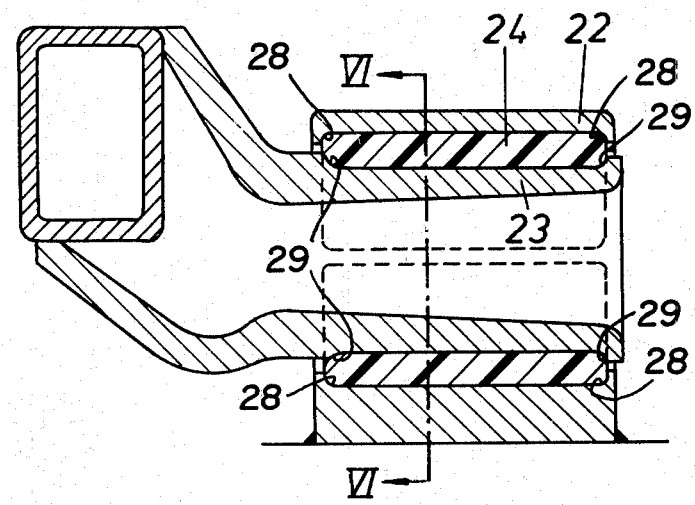
FIG. 5 is a longitudinal section taken along line 5—5 in FIG. 6 through a bearing device incorporated in the vehicle shown in FIGS. 1-4 for mounting a crawler frame to the main frame of the undercarriage.
Figure 6:
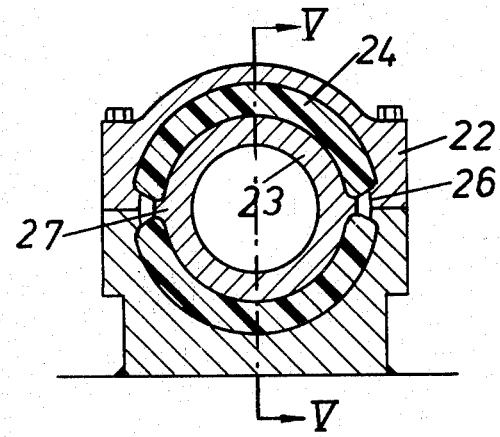
FIG. 6 is a cross section taken along line 6—6 in FIG. 5.

Referring to FIGS. 5 and 6, each of the bearings comprises a bearing box 22, a journal 23 and a bearing element 24 therebetween made of an elastic material, e.g., rubber. The elastic element 24 permits a limited universal movement between the bearing box 22 and the journal 23. Each elastic element 24 comprises a bushing that is axially divided into two halves. In order to prevent a rotary sliding movement between the bushing 24 and the bearing box 22, the latter is provided with two axially extending internal ridges 26 (FIG. 6) between which the two halves of the bushing 24 is pre-compressed. In the same way, the journal 23 is provided with two external axially extending ridges 27 (FIG. 6) to prevent a sliding rotary movement between the bushing 24 and the journal 23. As can be seen in FIG. 5, the bearing box 22 is provided with annular axial shoulders 28 and the journal 23 is provided with annular axial shoulders 29 to prevent axial sliding movement between the bushing 24 and bearing box 22 and between the bushing 24 and the journal 23. By the tangential and radial pre-compression of the bushing that is provided in this way, wear as a result of surface friction is avoided since all movements in the bearings will be taken up as elastic deformations and not as sliding movements.

Since the bearings of the above described kind have the quality of permitting bigger movements in the shearing directions of the elastic bushing 24, i.e. turning about the axis of the journal 23 and axial displacement along the same axis — than in the directions of compression of the elastic bushing 24, i.e. bending, the bearing has a pronounced "directed action" although it permits a limited universal movement. This directed action will be still more pronounced if the thickness of the elastic bushing 24 is reduced so that the universal movability is decreased. An increased ratio between the length and the diameter of the bushing will also increase the directed action of the bearing. On the other hand, a thicker and shorter bushing 24 will increase the universal movability and reduce the directed action.

Figure 2:
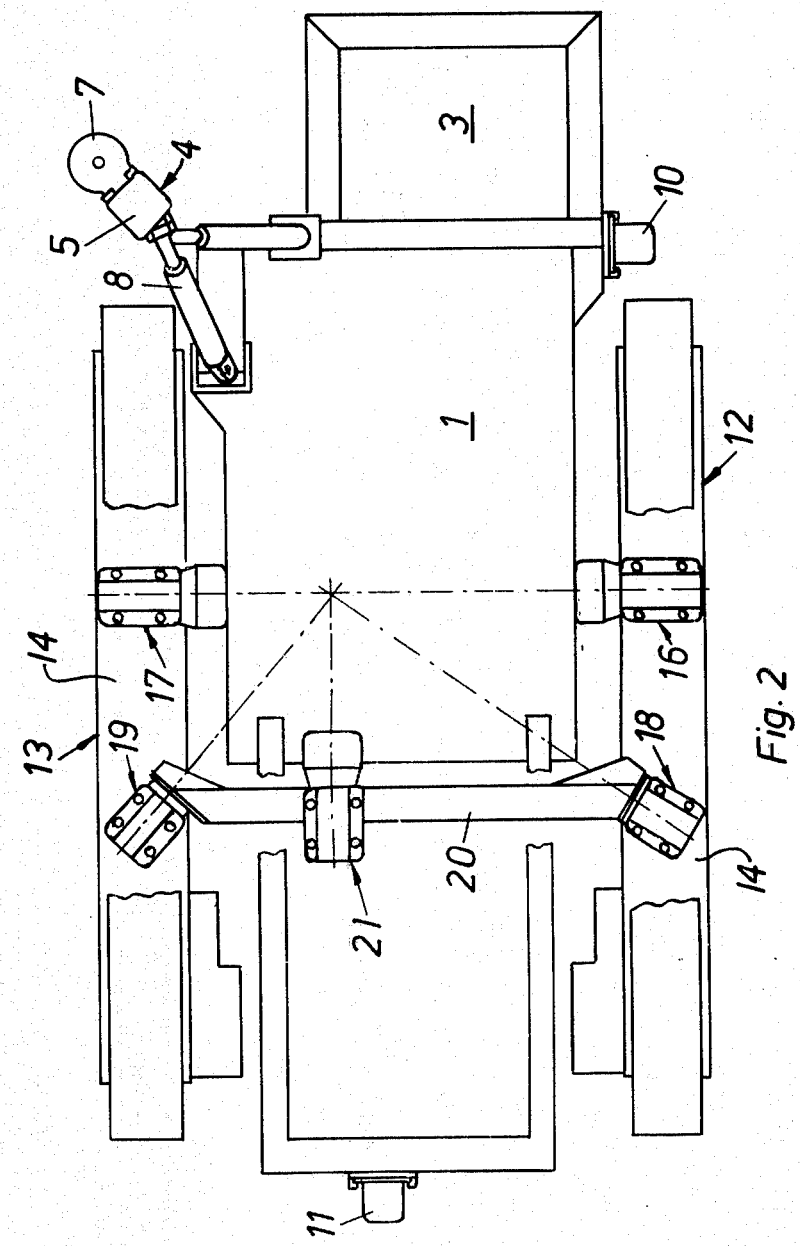
FIG. 2 is a schematic top view of the undercarriage of the drill rig illustrated in FIG. 1.
Figure 3:
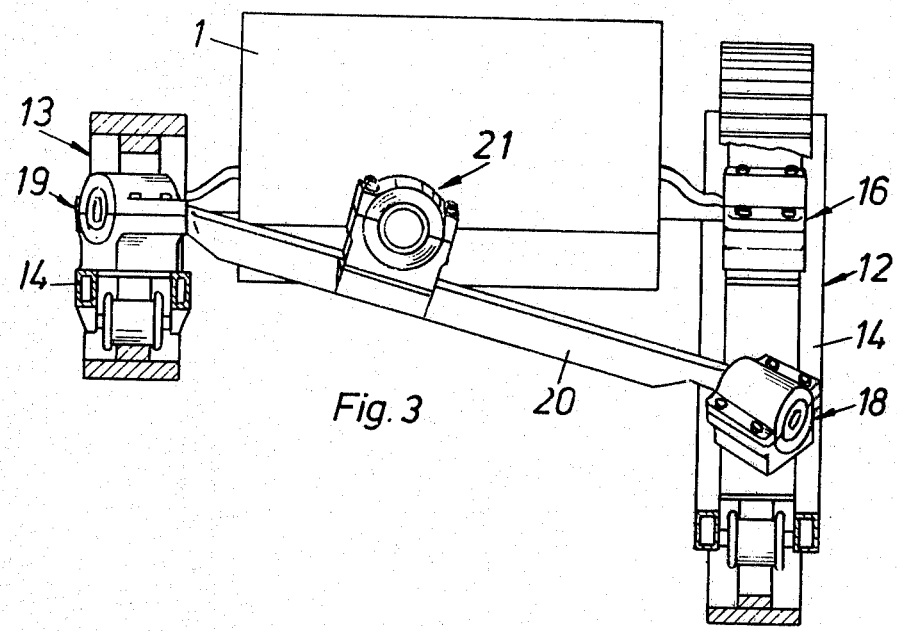
FIG. 3 is an end view, partly in section along line 3—3 in FIG. 4, of the undercarriage shown in FIG. 2, one of the crawler frames being pivoted downwardly.
Figure 4:
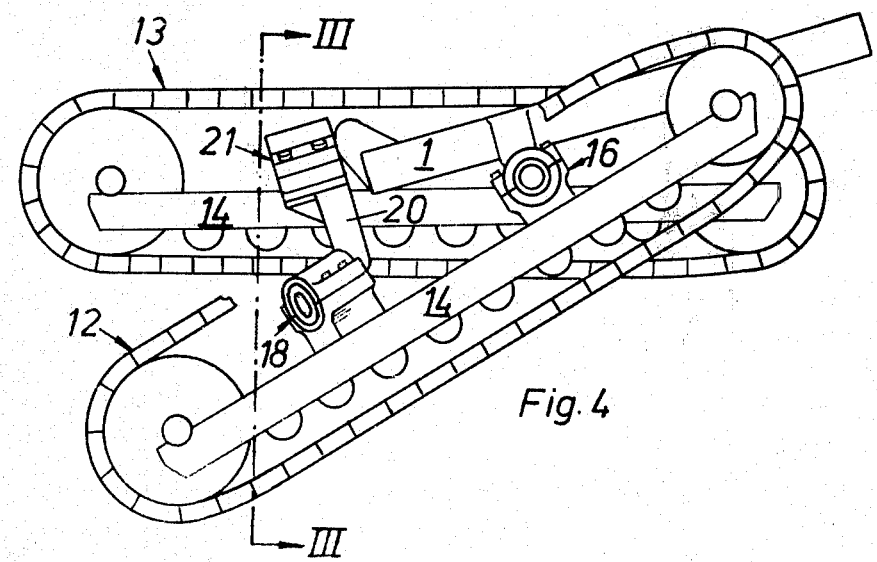
FIG. 4 is a side view of the same undercarriage.

As can be seen in FIGS. 2 and 3, the bearings have been arranged in a specific geometrical pattern. The bearings 16, 17 that directly connect the crawler frames 13 with the main frame 1 are oriented transverse to the vehicle and their journals are aligned. The bearings 18, 19 that connect the crawler frames to the transverse beam 20 are oriented so that substantially only shearing deformation due to turning about their axes and axial movement will occur in their elastic bushing when the crawler frames are pivoted relative to each other. This is accomplished by having the bearings 18, 19 directed so that their axes intersect the common axis of the bearings 16, 17 at a single point. In the top view shown in FIG. 2 in which the crawler frames are horizontal, the axis of the bearing 21 lies in a vertical plane through this point of intersection. The axes of bearings 16, 17, 18, 19 lie in a common plane when the crawler frames rest on an even surface and, preferably, the axis of bearing 21 should also lie in that plane. However, in the vehicle illustrated, the bearing 21 is located above the other bearings so that its axis passes above the common axis of bearings 16, 17 in a plane parallel with a horizontal plane through the axes of the bearings 16, 17, 18, 19.

It is not necessary that the axes of the bearings 16–19 intersect each other at one point if the bearings are constructed to be able to take up the bending that will result if they do not. However, the bearings should not be more flexible in the bending directions than necessary and the axes of the bearings 16–19 and preferably also the axis of the bearings 21 should cross each other within an imaginary sphere having a radius of 0.3 m.

Besides the advantage of their cutting down the dynamic loads imposed on the crawler frames and the main frame, the bearings described have considerable economic advantages. One advantage is the low manufacturing cost due to the low demands of machining that result mainly from the fact that sliding movements between the bushings and the bearing boxes and between the bushings and the journals are avoided. Another advantage is the low cost for material and reduced downtime when the bearings are rebuilt or renovated. In such a renovating, the bearing boxes are parted and the elastic bushings are replaced. The bushings are very inexpensive to manufacture.

Figure 7:
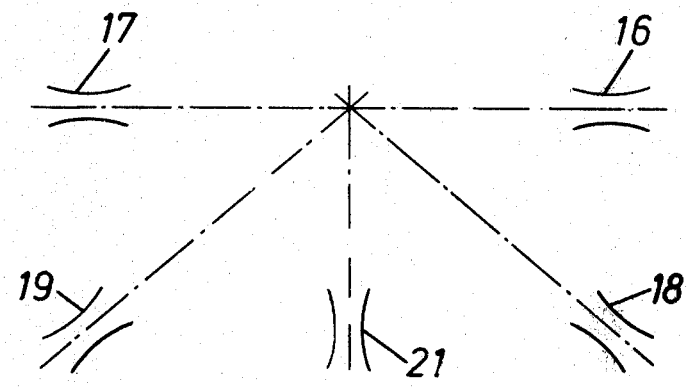
FIG. 7 is a very schematic top view showing a slight modification of the geometry of the mounting of the crawler frames.

A somewhat modified geometrical configuration of the bearings is shown in FIG. 7. The axes of all the bearings 16–19 and 21 lie in a common plane when the crawler frames are not pivoted relative to each other and the bearing 21 is located midway between the bearings 18, 19. The centers of the bearings 16–19 form a rectangle as they do in FIG. 2.

What I claim is:
1. A crawler vehicle comprising:
a main frame;
two substantially parallel crawler assemblies with respective frames; and
means for pivotally mounting the crawler assembly frames to the main frame, said crawler assembly frames being pivotable relative to each other about axes transverse to the crawler frames;
said pivotal mounting means including respective journal bearing devices connecting the main frame with each of the crawler frames, each of said journal bearing devices comprising a journal, a bearing box receiving the journal therein and an elastic element mounted between the journal and the bearing box to prevent direct contact between the journal and the bearing box, at least one of said journal and bearing box having at least one axially directed abutment extending therefrom, and said bearing box and journal each having at least two axially spaced abutment shoulders, said elastic element being pre-compressed between said journal and said bearing box and between said abutment shoulders so as to abut against said at least one axially directed abutment and against said abutment shoulders, thereby preventing sliding movements between said elastic element and said journal and bearing box, whereby turning and axial displacement between said journal and said bearing box causes shearing deformations of said elastic element.

2. A crawler vehicle according to claim 1 wherein axially directed abutments are provided on both the journal and the bearing box for abutment against said elastic element.

3. A crawler vehicle according to claim 1 wherein said bearing boxes of respective journal bearing devices are connected to respective crawler frames, and wherein said journals of the respective bearing devices are connected to said main frame.

4. A crawler vehicle according to claim 1 wherein said bearing boxes comprise first and second portions and means for clamping said first and second portions together to pre-compress the elastic element between a journal and the respective bearing box.

5. A crawler vehicle according to claim 4 wherein each of said journal and bearing box have a pair of substantially diametrically disposed axially directed abutments thereon for abutment against said elastic element.

6. A crawler vehicle according to claim 5 wherein said elastic element comprises a pair of elastic members, each of which is clamped between a respective portion of the bearing box and the journal, the edges of the elastic members abutting against the axially directed abutments and the abutment shoulders.

7. A crawler vehicle according to claim 6 wherein each of said elastic members iss generally rectagular sheet-like elastic member.

8. A crawler vehicle comprising:
a main frame;
two substantially parallel crawler assemblies with respective frames;
journal bearing means for pivotally mounting the crawler assembly frames to the main frame, said crawler assembly frames being pivotable relative to each other about axes transverse to the crawler frames;
a transverse beam coupled to the main frame for indirectly coupling the crawler frames to the main frame; and
means for movably connecting opposite ends of the transverse beam to the respective crawler frames;
said journal bearing means including respective journal bearing devices connecting the main frame with each of the crawler frames, each of said journal bearing devices comprising a journal, a bearing box receiving the journal therein and an elastic element mounted between the journal and the bearing box to prevent direct contact between the journal and the bearing box, at least one of said journal and bearing box having at least one axially directed abutment extending therefrom, and said bearing box and journal each having at least two axially spaced abutment shoulders, said elastic element being pre-compressed between said journal and said bearing box and between said abutment shoulders so as to abut against said at least one axially directed abutment and against said abutment shoulders, thereby preventing sliding movements between said elastic element and said journal and bearing box, whereby relative movement between the bearing box and the journal is taken up as elastic deformation of the elastic member so as to provide limited universal mobility between the main frame and the respective crawler frames, turning and axial displacement between said journal and said bearing box causing shearing deformations of said elastic element.

9. A crawler vehicle according to claim 8, in which said movable connecting means between the ends of the transverse beam and the crawler frames each comprise further journal bearings that are directed to form angles with the transverse beam so as to form axes of turning that are directed obliquely inwardly, said further journal bearings being arranged to permit movement along said axes of turning.

10. A crawler vehicle according to claim 9, in which said further journal bearings forming the connections between the ends of the transverse beam and the crawler frames include respective elastic elements arranged to take up relative movements in the bearings as elastic deformation when the crawler frames swing relative to the main frame.

11. A crawler vehicle according to claim 10 further comprising an additional journal bearing mounting said transverse beam to said main frame, the additional journal bearing including an elastic element to permit axial displacement, turning and some bending in the additional bearing.

12. A crawler vehicle according to claim 11, in which the axis of said additional journal bearing between the main frame and the transverse beam lies in a longitudinal plane through a point in which said inwardly directed axes intersect each other, said longitudinal plane being vertical when said crawler assemblies rest on an even horizontal surface.

13. A crawler vehicle according to claim 10, in which said inwardly directed axes cross each other near said transverse axes.

14. A crawler vehicle according to claim 10, in which said inwardly directed axes and said transverse axes all pass through an imaginary sphere having a radius of about 0.3 m.

15. A crawler vehicle according to claim 11, in which said inwardly directed axes, said transverse axes, and the axis of said journal bearing between the main frame and the transverse beam all pass through an imaginary sphere having a radius of about 0.3 m.

16. A crawler vehicle according to claim 10, in which said inwardly directed axes and said transverse axes intersect each other at a single point.

17. A crawler vehicle according to claim 11, in which said inwardly directed axes, said transverse axes, and the axis of said journal bearing between the main frame and the transverse beam all intersect each other at a single point.

18. A crawler vehicle according to claim 10, in which said transverse axes are aligned.

19. A crawler vehicle according to claim 9, in which said inwardly directed axes and said transverse axes lie in a common plane when the crawler frames rest on an even surface.

20. A crawler vehicle comprising:
a main frame;
a pair of crawler frames to carry said main frame;
means for journal-mounting the main frame to the crawler frames to swing about axes transverse to the respective crawler frames; and
a transverse beam having its opposite end portions movably connected to said crawler frames, said transverse beam being movably connected to said main frame at a point intermediate the crawler frames so as to support said main frame but being swingable thereto about said point;
the movable connections between the end portions of the transverse beam and the crawler frames each comprising journal bearings having axes directed to form angles with the transverse beam so as to form axes of turning that are directed obliquely inwardly, said journal bearings each including elastically deformable elements to permit limited universal movements and to take up as elastic deformations the movements created when the crawler frames swing relative to each other.

21. A crawler vehicle according to claim 9 wherein said further journal bearings are of the same construction as said journal bearing devices which connect the main frame with each of the crawler frames.

22. A crawler vehicle according to claim 11 wherein said additional and further journal bearings are of the same construction as said journal bearing devices connecting the main frame with each of the crawler frames.

23. A crawler vehicle according to claim 10, in which said inwardly directed axes and said transverse axes substantially intersect each other at a single point.

24. A crawler vehicle according to claim 8 wherein axially directed abutments are provided on both the journal and the bearing box for abutment against said elastic element.

25. A crawler vehicle according to claim 8 wherein said bearing boxes of respective journal bearing devices are connected to respective crawler frames, and wherein said journals of the respective bearing devices are connected to said main frame.

26. A crawler vehicle according to claim 8 wherein said bearing boxes comprise first and second portions and means for clamping said first and second portions together to pre-compress the elastic element between a journal and the respective bearing box.

27. A crawler vehicle according to claim 26 wherein each of said journal and bearing box have a pair of substantially diametrically disposed axially directed abutments thereon for abutment against said elastic element.

28. A crawler vehicle according to claim 27 wherein said elastic element comprises a pair of elastic members, each of which is clamped between a respective portion of the bearing box and the journal, the edges of the elastic members abutting against the axially directed abutments and the abutment shoulders.

29. A crawler vehicle according to claim 28 wherein each of said elastic members is a generally rectangular sheet-like elastic member.

30. A crawler vehicle comprising:
a main frame;
two substantially parallel crawler assemblies with respective frames;
jounal bearing means for pivotally mounting the crawler assembly frames to the main frame, said crawler assembly frames being pivotable relative to each other about axes transverse to the crawler frames;
said journal bearing means including respective journal bearing devices connecting the main frame with each of the crawler frames, each of said journal bearing devices comprising a journal, a bearing box receiving the journal therein and an elastic element mounted between the journal and the bearing box to prevent direct contact between the journal and the bearing box and to take up as elastic deformation a relative movement between the bearing box and the journal so as to provide for a limited universal movability between the main frame and the respective crawler frames;
a transverse beam coupled to the main frame for indirectly coupling the crawler frames to the main frame; and
means for movably connecting opposite ends of the transverse beam to the respective crawler frames;
said movable connecting means between the ends of the transverse beam and the crawler frames each comprising further journal bearings that are directed to form angles with the transverse beam so as to form axes of turning that are directed obliquely inwardly, said further journal bearings being arranged to permit movement along said axes of turning.

31. A crawler vehicle according to claim 30, in which said further journal bearings forming the connections between the ends of the transverse beam and the crawler frames include respective elastic elements arranged to take up relative movements in the bearings as elastic deformation when the crawler frames swing relative to the main frame.

32. A crawler vehicle according to claim 31 further comprising an additional journal bearing mounting said transverse beam to said main frame, the additional journal bearing including an elastic element to permit axial displacement, turning and some bending in additional bearing.

33. A crawler vehicle according to claim 32, in which the axis of said additional journal bearing between the main frame and the transverse beam lies in a longitudinal plane through a point in which said inwardly directed axes intersect each other, said longitudinal plane being vertical when said crawler assemblies rest on an even horizontal surface.

34. A crawler vehicle according to claim 31, in which said inwardly directed axes cross each other near said transverse axes.

35. A crawler vehicle according to claim 31, in which said inwardly directed axes and said transverse axes all pass through an imaginary sphere having a radius of about 0.3 m.

36. A crawler vehicle according to claim 32, in which said inwardly directed axes, said transverse axes, and the axis of said journal being between the main frame and the transverse beam all pass through an imaginary sphere having a radius of about 0.3 m.

37. A crawler vehicle according to claim 31, in which said inwardly directed axes and said transverse axes intersect each other at a single point.

38. A crawler vehicle according to claim 32, in which said inwardly directed axes, said transverse axes, and the axis of said journal bearing between the main frame and the transverse beam all intersect each other at a single point.

39. A crawler vehicle according to claim 31, in which said transverse axes are aligned.

40. A crawler vehicle according to claim 30, in which said inwardly directed axes and said transverse axes lie in aa common plane when the crawler frames rest on an even surface.

41. A crawler vehicle according to claim 30 wherein axially directed abutments are provided on both the journal and the bearing box for abutment against said elastic element.

42. A crawler vehicle according to claim 30 wherein said bearing boxes of respective journal bearing devices are connected to respective crawler frames, and wherein said journals of the respective bearing device are connected to said main frame.

43. A crawler vehicle according to claim 30 wherein said bearing boxes comprise first and second portions and means for clamping said first and second portions together to pre-compress the elastic element between a journal and the respective bearing box.

44. A crawler vehicle according to claim 43 wherein each of said journal and bearing box have a pair of substantially diametrically disposed axially directed abutments thereon for abutment against said elastic element.

45. A crawler vehicle according to claim 44 wherein said elastic element comprises a pair of elastic members, each of which is clamped between a respective portion of the bearing box and the journal, the edges of the elastic members abutting against the axially directed abutments and the abutment shoulders.

46. A crawler vehicle according to claim 45 wherein each of said elastic members is a generally rectangular sheet-like elastic member.

47. A crawler vehicle according to claim 20 wherein said journal bearings which comprise the movable connections between the end portions of the transverse beam and the crawler frames each comprise a journal, a bearing box receiving the journal therein and an elastic element mounted between the journal and the bearing box to prevent direct contact between the journal and the bearing box, at least one of said journal and bearing box having at least one axially directed abutment extending therefrom, and said bearing box and journal each having at least two axially spaced abutment shoulders, said elastic element being pre-compressed between said journal and said bearing box and between said abutment shoulders so as to abut against said at least one axially directed abutment and against said abutment shoulders, thereby preventing sliding movements between said elastic element and said journal and bearing box, whereby relative movement between the bearing box and the journal is taken up as elastic deformation of the elastic member.

48. A crawler vehicle according to claim 47 wherein axially directed abutments are provided on both the journal and the bearing box for abutment against said elastic element.

49. A crawler vehicle according to claim 47 wherein said bearing boxes of respective journal bearing devices are connected to respective crawler frames, and wherein said journals of the respective bearing devices are connected to said main frame.

50. A crawler vehicle according to claim 47 wherein said bearing boxes comprise first and second portions and means for clamping said first and second portions together to pre-compress the elastic element between a journal and the respective bearing box.

51. A crawler vehicle according to claim 50 wherein each of said journal and bearing box have a pair of substantially diametrically disposed axially directed abutments thereon for abutment against said elastic element.

52. A crawler vehicle according to claim 51 wherein said elastic element comprises a pair of elastic members, each of which is clamped between a respective portion of the bearing box and the journal, the edges of the elastic members abutting against the axially directed abutments and the abutment shoulders.

53. A crawler vehicle according to claim 52 wherein each of said elastic members is a generally rectangular sheet-like elastic member.

54. A crawler vehicle according to claim 26 further comprising an additional journal bearing mounting said transverse beam to said main frame, the additional journal bearing including an elastic element to permit axial displacement, turning and some bending in the additional bearing.

55. A crawler vehicle according to claim 54, in which the axis of said additional journal bearing between the main frame and the transverse beam lies in a longitudinal plane through a point in which said inwardly directed axes intersect each other, said longitudinal plane being vertical when said crawler assemblies rest on an even horizontal surface.

56. A crawler vehicle according to claim 54, in which said inwardly directed axes cross each other near said transverse axes.

57. A crawler vehicle according to claim 54, in which said inwardly directed axes and said transverse axes all pass through an imaginary sphere having a radius of about 0.3 m.

58. A crawler vehicle according to claim 54, in which said inwardly directed axes, said transverse axes, and the axis of said journal bearing between the main frame and the transverse beam all pass through an imaginary sphere having a radius of about 0.3 m.

59. A crawler vehicle according to claim 20, in which said inwardly directed axes and said transverse axes intersect each other at a single point.

60. A crawler vehicle according to claim 54, in which said inwardly directed axes, said transverse axes, and the axis of said journal bearing between the main frame and the transverse beam all intersect each other at a single point.

61. A crawler vehicle according to claim 20, in which said transverse axes are aligned.

62. A crawler vehicle according to claim 20, in which said inwardly directed axes and said transverse axes lie in a common plane when the crawler frames rest on an even surface.

* * * * *

UNITED STATES PATENT AND TRADEMARK OFFICE
CERTIFICATE OF CORRECTION

PATENT NO. : 3,974,891
DATED : August 17, 1976
INVENTOR(S) : Jan Edvard PERSSON

It is certified that error appears in the above-identified patent and that said Letters Patent are hereby corrected as shown below:

Column 5, line 27, after "elastic members" change "iss" to --is a--; after "generally" change "rectagular" to --rectangular--;

Column 8, line 60, before "common plane" change "aa" to --a--;

Column 9, line 1, after "respective bearing" change "device" to --devices--.

Signed and Sealed this

Twelfth Day of October 1976

[SEAL]

Attest:

RUTH C. MASON
*Attesting Officer*

C. MARSHALL DANN
*Commissioner of Patents and Trademarks*